United States Patent

Schwarz et al.

[11] Patent Number: 5,044,458
[45] Date of Patent: Sep. 3, 1991

[54] DRIVE ENGAGEMENT FOR A SELECTIVELY ENGAGEABLE WHEELSET

[75] Inventors: Reinhard Schwarz, Gondelsheim; Dieter Nobis, Lonsee-Halzhausen, both of Fed. Rep. of Germany

[73] Assignee: Deere & Company, Moline, Ill.

[21] Appl. No.: 505,093

[22] Filed: Apr. 4, 1990

Related U.S. Application Data

[63] Continuation of Ser. No. 296,912, Jan. 12, 1989, abandoned, which is a continuation of Ser. No. 103,482, Sep. 30, 1987, abandoned.

[30] Foreign Application Priority Data

Oct. 1, 1986 [DE] Fed. Rep. of Germany ....... 3633424

[51] Int. Cl.$^5$ .................... B60K 17/344; B60K 23/08
[52] U.S. Cl. .................... 180/248; 180/233; 180/244; 180/247
[58] Field of Search ............... 180/247, 248, 249, 250, 180/233; 192/48.3, 48.92, 56 F, 57, 58 C

[56] References Cited

U.S. PATENT DOCUMENTS

| | | | |
|---|---|---|---|
| 4,081,063 | 3/1978 | Malmros et al. | 192/56 F |
| 4,132,297 | 1/1979 | Brown et al. | 180/248 X |
| 4,185,723 | 1/1980 | Kelbel | 180/247 X |
| 4,586,583 | 5/1986 | Yamakawa et al. | 180/247 |
| 4,597,467 | 7/1986 | Stockton | 180/248 |
| 4,605,087 | 8/1986 | Ashaver et al. | 180/248 |
| 4,609,064 | 9/1986 | Suzuki et al. | 180/247 X |
| 4,671,377 | 6/1987 | Ehrlinger et al. | 180/248 X |
| 4,683,998 | 8/1987 | Cigdem et al. | 192/58 C |

FOREIGN PATENT DOCUMENTS

| | | | |
|---|---|---|---|
| 0049961 | 4/1982 | European Pat. Off. | |
| 212721 | 3/1987 | European Pat. Off. | 180/248 |
| 214757 | 3/1987 | European Pat. Off. | 180/249 |
| 7532940 | 8/1975 | Fed. Rep. of Germany . | |
| 2929351 | 2/1981 | Fed. Rep. of Germany | 180/248 |
| 2552034 | 3/1985 | France . | |
| 2132303 | 7/1984 | United Kingdom . | |
| 2163107 | 2/1986 | United Kingdom | 180/248 |

OTHER PUBLICATIONS

Fachbuch: "Zahnradgetriebe", Verfasser Johannes Looman, Ausgabe 1970, Kapitel 7.1, Verteilergetriebe.

Primary Examiner—Mitchell J. Hill

[57] ABSTRACT

A drive arrangement for a selectively engageable wheelset includes a clutch and a freewheel arranged in series, one behind the other, between a transmission and the selectively engageable wheelset. The clutch is designed as an overload release clutch, so that overloading of the drive to the selectively engageable wheelset is avoided when the freewheel is engaged. In addition, the clutch will permit interruption of the drive to the selectively engageable wheelset completely and as long as desired. The freewheel can be locked as a function of various operating conditions or upon demand.

6 Claims, 1 Drawing Sheet

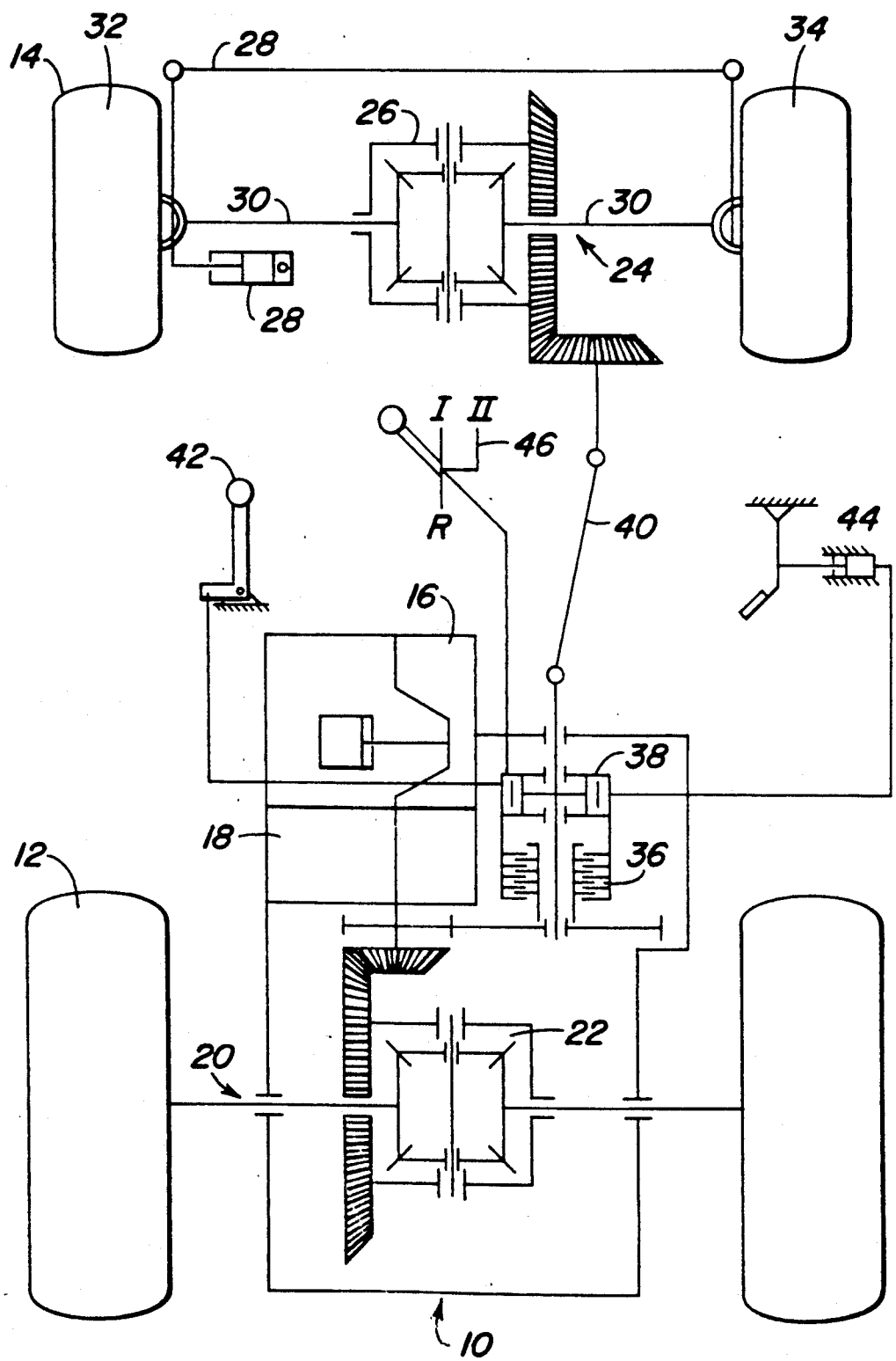

DRIVE ENGAGEMENT FOR A SELECTIVELY ENGAGEABLE WHEELSET

This is a continuation of application Ser. No. 07/296,912, filed 12 Jan. 1989 abandoned, which was a continuation of application Ser. No. 07/103,482, filed 30 Sept. 1989 abandoned.

BACKGROUND OF THE INVENTION

1. Field of the Invention

The invention concerns a drive arrangement having a freewheel, clutch and differential for driving a selectively engageable wheelset, in particular for that of a front axle of a motor vehicle where at least one additional constantly engaged wheelset is provided.

2. Description of the Related Art

The drive arrangement taught by DE-GM 7 532 940 provides a clutch as well as a freewheel in the drive line for a selectively engageable wheelset, so that the drive to the front wheels of a motor vehicle can occur either through the freewheel or through the clutch. This means that either a fixed relationship is maintained between the rotational speeds of the two wheelsets, and hence that the advancing selectively engageable wheelset will continously slide over the ground, or that the freewheel establishes a drive connection to the selectively engageable wheelset beginning at a certain degree of slip of the constantly engaged wheelset. In this drive arrangement, the front wheelset can be shifted only under certain conditions, namely when the clutch is engaged, or when the freewheel can transmit power to the selectively engageable wheelset above a certain slip at the constantly engaged wheelset.

This drive arrangement has the disadvantage that power is transmitted to the selectively engageable wheelset either under only limited conditions or it is engaged constantly (except when it overruns the constantly engaged wheelset). In addition, the driveline to the selectively engageable wheelset is not protected against overload.

SUMMARY OF THE INVENTION

The problem underlying this invention is seen as that of improving the drive arrangements in such a way that the driveline to the selectively engageable wheelset is simultaneously protected against overload and unnecessary use.

This problem has been solved by arranging the driveline for the selectively engageable wheelset with the clutch and the freewheel in series, one behind the other, using a clutch that can both be selectively engaged and disengaged, and that can operate as an overload release clutch.

By this means, the advantages of the clutch as well as the freewheel are utilized in the driveline for the selectively engageable wheelset The clutch prevents unexpected loading of the driveline for the selectively engageable wheelset, while the freewheel disconnects the drive to the selectively engageable wheelset when it is overrunning the constantly engaged wheelset. In addition, overloading of the driveline for the selectively engageable wheelset is avoided, since the clutch will slip or disengage completely above a certain transmitted torque.

By reason of the differential gear and the freewheel, the selectively engageable wheelset has no power transmitted to it as long as its average speed is greater than the average speed of the constantly engaged wheelset.

In addition, the freewheel preferably can be locked under certain conditions, for example, allowing for the transfer of braking force to the selectively engageable wheelset during braking. Furthermore, locking of the freewheel whenever reverse gear is engaged allows supplying of power to the selectively engageable wheelset during reverse operation when the freewheel would otherwise overrun.

BRIEF DESCRIPTION OF THE DRAWING

The drawing shows schematically an example of the invention which is described in detail in the following.

DETAILED DESCRIPTION OF THE PREFERRED EMBODIMENT

A motor vehicle 10, such as an agricultural tractor, construction equipment or similar machine, is equipped with a rear wheelset 12 and a selectively engageable front wheelset 14 which are driven by an engine 16 through a transmission 18.

The rear wheelset 12 is arranged on an axle 20, which in turn contains a differential gear 22, and is continuously driven by means of the transmission 18, as long as the usual main clutches, not shown, are engaged.

The front wheelset 14 also is mounted on an axle 24 which contains a differential gear 26. The axle 24 is configured as a steerable axle and can be steered by an appropriate steering arrangement 28. On either side of the differential gear 26, power transmitting half-shafts 30 extend to the left and right wheels 32 and 34.

The transmission 18 transmits power to a hydraulically controlled clutch 36, which may be configured as a multi-plate clutch, and from this to a freewheel 38. The freewheel 38 is connected at one end to the clutch 36 and at the other end to a drive shaft 40, which transmits power to the differential gear 26. The gear ratios provided in the transmission 18 are normally selected in such a way that the front wheelset 14 is driven 2% to 5% faster than the rear wheelset 12 in straight-ahead operation.

The freewheel 38 is so arranged that no power is transmitted to the differential gear 26, and hence to the front wheelset 14, when the clutch 36 is engaged and during straight-ahead operation as long as the front wheelset 14 is operating at a speed greater than that imposed by the clutch 36. Together with the gear ratios in the transmission 18, as noted, this will result in no torque being transmitted to the front wheelset 14 until the rear wheelset 12 shows at least 2% to 5% slip. Only after this value of slip has been reached will the freewheel 38 provide a rigid connection between the drive shaft 40 and the clutch 36.

Preferably, the freewheel 38 can be locked depending on conditions other than the difference in speed between the front and the rear wheelsets 14 and 12. For example, via a lever 42, a brake pedal 44 and a shift lever 46, each of which is connected to the freewheel 38 by a control unit, not shown.

By means of the lever 42, arranged on an operating platform, not shown, of the motor vehicle 10, the operator of the motor vehicle 10 can arbitrarily lock or unlock the freewheel 38.

By means of the brake pedal 44, the freewheel 38 is locked each time the brakes, not shown, of the motor vehicle 10 are actuated. In this way, a connection is established between the wheelsets 12 and 14 during braking, which makes it possible to transfer braking torque from the brakes of the rear wheelset 12 to the front wheelset 14, and thus eliminate the need for separate brakes for the front wheelset 14.

In addition, the freewheel 38 can be locked by means of the shift lever 46 each time the motor vehicle 10 is to be operated in reverse. Without such a lock, the freewheel 38, operating as a simple overrunning clutch, would continuously overrun during reverse operation and could never transmit any driving torque to the front wheelset 14. Locking the freewheel 38 will assure the availability of driving torque at both the wheelsets 12 and 14 during reverse operation.

It also is possible to control the freewheel 38 as a function of the position of the steering arrangement 28.

To develop driving torque at the front wheelset 14, the clutch 36 must be engaged and a connection established between the transmission 18 and the freewheel 38. The clutch 36 can be controlled arbitrarily by the operator or it may be controlled by other operating conditions, such as a braking operation, a change in the exhaust gas temperature of the engine 16, a load applied to a three-point equipment hitch, not shown, or other conditions. If necessary, control of the clutch 36 and the freewheel 38 can be combined.

The advantage of the clutch 36 lies in the fact that it permits the drive to the front wheelset 14 to be interrupted under certain conditions, so that an excessive overload of the clutch 36, the freewheel 38 and the drive shaft 40 can be avoided.

When both the clutch 36 and the freewheel 38 are engaged, the half-shafts 30 leading to the left and the right front wheels 32 and 34 will rotate at different speeds during cornering, due to the differential gear 26 for the front wheelset 14. Hence, during cornering, no overload can occur between the half-shaft 30 for the left wheel 32 and the half-shaft 30 for the right wheel 34. As long as the average rotational speed of the two half-shafts 30 during cornering results in a speed equal to that of the drive shaft 40, no overload can occur between the front and the rear wheelset 14 and 12, since the freewheel 38 will at that time be overrunning the speed of the clutch 36. This condition will occur when the front wheelset 14 is operating at an average steering radius that is greater than that of the rear wheelset 12, increased by the percentage in the overrun of the front wheelset 14. This will occur at a deflection of the steering arrangement 28 of approximately 35 degrees.

The transmission of power to the front wheelset 14 is dependent upon the slip existing at the rear wheelset 12, so that with a slip greater than 2% to 5%, either straight ahead or cornering, the freewheel 38 may be locked.

As soon as the freewheel 38 is engaged, the maximum torque that can be transmitted to the front wheelset 14 will be determined by the overload release torque of the clutch 36. This will avoid overloading of the freewheel 38, the drive shaft 40, the differential gear 26 and the half-shafts 30.

We claim:

1. A drive arrangement including a selectively engageable wheelset in a vehicle also having a substantially constantly engaged wheelset, a prime mover, and a differential drivingly connected to said selectively engageable wheelset, the arrangement comprising:
   a freewheel having a first side drivingly connected to the selectively engageable wheelset via said differential and a second side;
   an overload release clutch having a first side drivingly connected to said prime mover, said overload release clutch automatically disengaging when the torque transmitted therethrough exceeds a predetermined maximum.

2. The drive arrangement of claim 1, further comprising means for selectively locking said freewheel.

3. The drive arrangement of claim 1, further comprising means for automatically locking said freewheel depending upon the direction in which said clutch is being driven.

4. The drive arrangement of claim 1, wherein said vehicle has brakes for braking at least one of said wheelsets and wherein the arrangement further comprises means for automatically locking said freewheel when said brakes are applied.

5. The drive arrangement of claim 1, wherein said selectively engageable wheelset and said constantly engaged wheelset are front and rear wheelsets, respectively, of said vehicle.

6. The drive arrangement of claim 1, wherein said overload release clutch comprises a multi-plate clutch.

* * * * *

UNITED STATES PATENT AND TRADEMARK OFFICE
CERTIFICATE OF CORRECTION

PATENT NO. : 5,044,458
DATED : 3 September 1991
INVENTOR(S) : Reinhard Schwarz et al.

It is certified that error appears in the above-identified patent and that said Letters Patent is hereby corrected as shown below:

In Col. 4, line 24, after "said" (first occurrence), insert -- freewheel second side and a second side drivably connected to said --.

Signed and Sealed this

Nineteenth Day of January, 1993

*Attest:*

DOUGLAS B. COMER

*Attesting Officer*         *Acting Commissioner of Patents and Trademarks*